*(12)* United States Patent
Du et al.

(10) Patent No.: US 7,873,522 B2
(45) Date of Patent: Jan. 18, 2011

(54) MEASUREMENT OF SPOKEN LANGUAGE TRAINING, LEARNING AND TESTING

(75) Inventors: Robert Du, Shanghai (CN); Lingfei Song, Shanghai (CN); Nan N. Li, Shanghai (CN); Minerva Yeung, Los Altos Hills, CA (US)

(73) Assignee: Intel Corporation, Santa Clara, CA (US)

( * ) Notice: Subject to any disclaimer, the term of this patent is extended or adjusted under 35 U.S.C. 154(b) by 58 days.

(21) Appl. No.: 10/581,753

(22) PCT Filed: Jun. 24, 2005

(86) PCT No.: PCT/CN2005/000922

§ 371 (c)(1),
(2), (4) Date: Feb. 20, 2009

(87) PCT Pub. No.: WO2006/136061

PCT Pub. Date: Dec. 28, 2006

(65) Prior Publication Data

US 2009/0204398 A1    Aug. 13, 2009

(51) Int. Cl.
*G10L 15/00*    (2006.01)

(52) U.S. Cl. .............. 704/275; 704/235; 704/251; 434/178; 434/179

(58) Field of Classification Search .......... 704/235, 704/251, 275; 434/178, 179
See application file for complete search history.

(56) References Cited

U.S. PATENT DOCUMENTS

| | | | |
|---|---|---|---|
| 5,634,086 A * | 5/1997 | Rtischev et al. | 704/270 |
| 6,226,611 B1 * | 5/2001 | Neumeyer et al. | 704/246 |
| 2004/0193409 A1 * | 9/2004 | Hansen et al. | 704/215 |
| 2006/0057545 A1 * | 3/2006 | Mozer et al. | 434/156 |
| 2006/0111902 A1 * | 5/2006 | Julia et al. | 704/236 |
| 2007/0213982 A1 * | 9/2007 | Xi et al. | 704/243 |

* cited by examiner

*Primary Examiner*—Daniel D Abebe
(74) *Attorney, Agent, or Firm*—Blakely, Sokoloff, Taylor & Zafman LLP (57) ABSTRACT

The fluency of a spoken utterance or passage is measure and presented to the speaker and to others. In one embodiment, a method is described that includes recording a spoken utterance, evaluating the spoken utterance for accuracy, evaluating the spoken utterance for duration, and assigning a score to the spoken utterance based on the accuracy and the duration.

20 Claims, 8 Drawing Sheets

MEASUREMENT OF SPOKEN LANGUAGE TRAINING, LEARNING AND TESTING

CROSS-REFERENCE TO RELATED APPLICATION

This application is a National Phase application of, and claims priority to, International Application No. PCT/CN2005/000922, filed Jun. 24, 2005, entitled "THE MEASUREMENT OF SPOKENT LANGUAGE TRAINING, LEARNING & TESTING"

FIELD

The present description is related to evaluating spoken utterances for fluency, and in particular to combining measurements of speed with measurements of accuracy.

RELATED ART

Computer Assisted Language Learning (CALL) has been developed to allow an automated system to record a spoken utterance and then make an assessment of pronunciation. CALL systems can then generate a Goodness of Pronunciation (GOP) score for presentation to the speaker or another party such as a teacher, supervisor, or guardian. In a language instruction context, an automated GOP score allows a student to practice speaking exercises and to be informed of improvement or regression. CALL systems typically use a benchmark of accurate pronunciation, based on a model speaker or some combination of model speakers and then compare the spoken utterance to the model.

Efforts have been directed toward generating and providing detailed information about the pronunciation assessment. In a pronunciation assessment, the utterance is divided into individual features, such as words or phonemes. Each feature is assessed independently against the model. The student may then be informed that certain words or phonemes are mispronounced or inconsistently pronounced. This allows the student to focus attention on the areas that require the most improvement. In a sophisticated system, the automated system may provide information on how to improve pronunciation, such as by speaking higher or lower or by emphasizing a particular part of a phoneme.

BRIEF DESCRIPTION OF THE DRAWINGS

The accompanying drawings, which are incorporated herein and form part of the specification, illustrate embodiments of the present invention and, together with the description, further serve to explain principles of embodiments of the invention and to enable a person skilled in the pertinent art(s) to make and use the embodiments. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Figure 1:
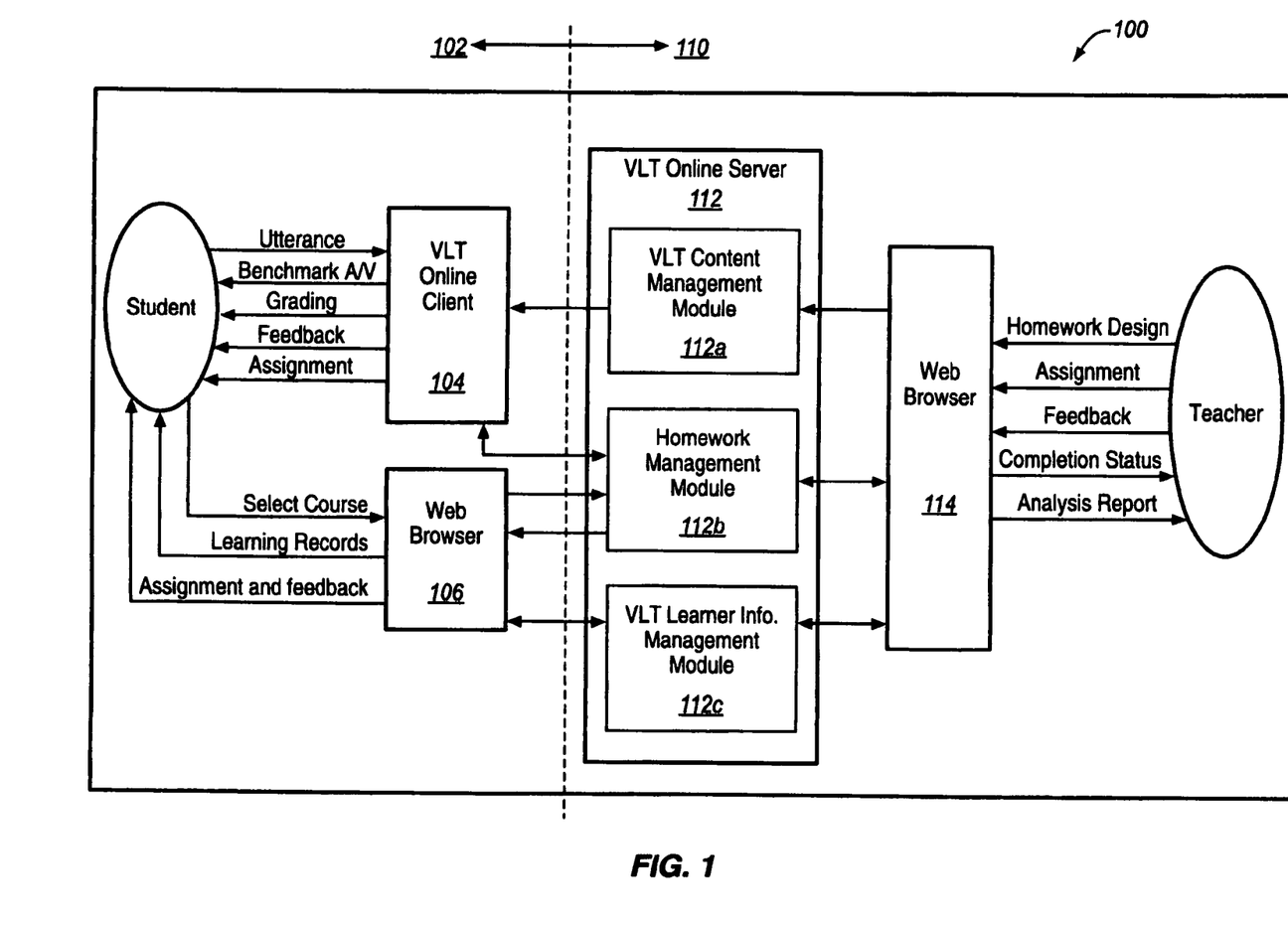
FIG. 1 is a block diagram illustrating an example of a client/server based assignment and assessment language learning system according to an embodiment of the present invention.

FIG. 1 is a block diagram illustrating an example of a client/server based language learning system 100 according to an embodiment of the present invention. System 100 comprises a client side 102 and a server side 110. Client side 102 comprises a virtual language tutor (VLT) online client 104 and a client web browser 106 for enabling a student to interact with system 100. Server side 110 comprises a virtual language tutor (VLT) online server 112 and a server web browser 114 for enabling a teacher to interact with system 100. Both VLT online client 104 and VLT online server 112 reside on a network, such as, for example, an Intranet or an Internet network. VLT online server 112 is coupled to VLT online client 104, client web browser 106, and server web browser 114.

A student may communicate with VLT online client 104 via a student computing device (not shown), such as a personal computer (PC), a lap top computer, a notebook computer, a workstation, a server, a mainframe, a hand-held computer, a palm top computer, a personal digital assistant (PDA), a telephony device, etc. Signals sent from VLT online client 104 to the student via the computing device include Assignment, Feedback, Grading, and Benchmark A/V signals. Signals sent to VLT online client 104 from the student include oral recitations of the Benchmark A/V signals, shown in FIG. 1 as Utterance signals. Assignment, Feedback, Grading, Benchmark A/V, and Utterance signals will be described in further detail below.

Virtual language tutor online server 112 comprises a virtual language tutor content management module 112a, a homework management module 112b, and a virtual language tutor learner information management module 112c. VLT content management module 112a comprises content modules that may be used for assignments, or to prepare assignments. Content for an assignment may be obtained from a plurality of sources, such as, for example, lectures, speeches, audio tapes, excerpts from audio books, etc. The content may be imported into content management module 112a with the aid of an administrator of system 100. Homework Management Module 112b allows the teacher to assign homework assignments to one or more students, one or more classes, etc.

The homework assignments are selected by the teacher from content management module 112a.

VLT Learner Information Management Module 112c comprises learning histories for all students that have previously used system 100. When a homework assignment has been completed by a student, the status of the homework assignment as well as the feedback and grading that results from the analysis of the oral practice by VLT online client 104 are uploaded to VLT online server 112 and immediately becomes part of the student's learning history in VLT Learner Information Management Module 112c. The status of the homework assignment including the feedback and grading of the oral practice are now accessible to the teacher. Learning histories may be provided to the individual student or to the teacher. Unless special permissions are provided, a student may only access his/her own learning history.

A student may communicate with VLT online server 112 via client web browser 106 using the computing device as well. In one embodiment, client web browser 106 may reside on the student computing device. In this instance, the student may select a language course offered by VLT online server, receive learning histories or records from previous assignments performed by the student and receive feedback from the teacher for one or more previous completed assignments.

A teacher may communicate with VLT online server 112 via server web browser 114 using a teacher computing device (not shown), such as a personal computer (PC), a lap top computer, a notebook computer, a workstation, a server, a mainframe, a hand-held computer, a palm top computer, a personal digital assistant (PDA), a telephony device, etc. In one embodiment, server web browser 114 may reside on the teacher computing device. Signals provided to the teacher from VLT online server 112 (via server web browser 114) include student completion status and analysis reports. Signals sent from the teacher (via the teacher computing device) to VLT online server 112 include homework design, assignment, and feedback. Student completion status, analysis reports, homework design, assignment, and feedback signals will be discussed in further detail below.

Figure 2:
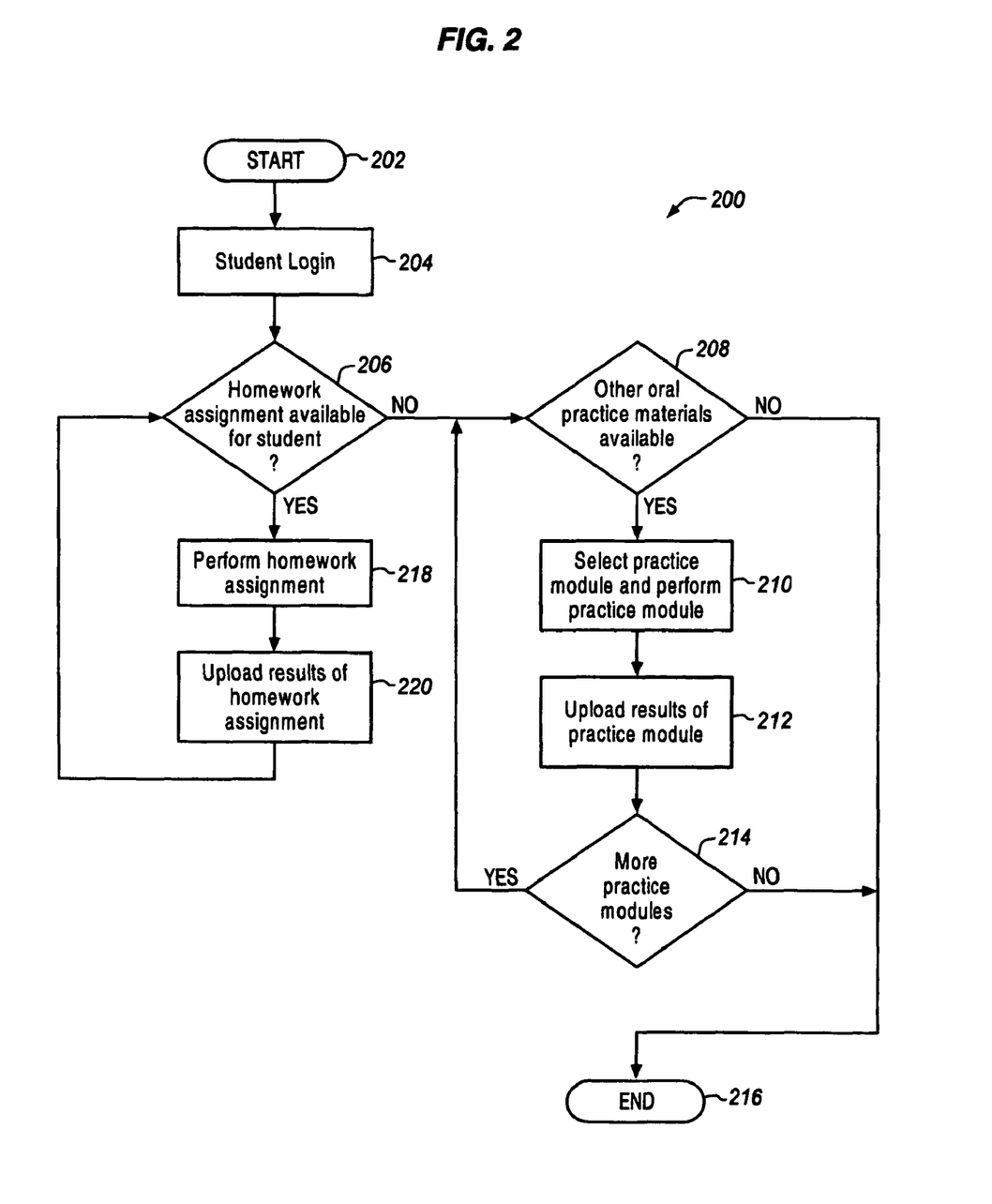
FIG. 2 is a flow diagram describing an example of a method for enabling a student to perform oral practice assignments according to an embodiment of the present invention.

VLT online client 104 comprises client software that enables a student to obtain oral practice assignments assigned by the teacher, perform the oral practice assignments, and receive performance results or feedback and grading based on their performance of the oral practice assignments. FIG. 2 is a flow diagram describing an example of a method for enabling a student to perform oral practice assignments on VLT online client 104 according to an embodiment of the present invention. The invention is not limited to the embodiment described herein with respect to flow diagram 200. Rather, it will be apparent to persons skilled in the relevant art(s) after reading the teachings provided herein that other functional flow diagrams are within the scope of the invention. The process begins with block 202, where the process immediately proceeds to block 204.

In block 204, a student may log on to VLT online client 104 using a computing device, such as a personal computer (PC), a workstation, a server, a mainframe, a hand-held computer, a palm top computer, a personal digital assistant (PDA), a telephony device, a network appliance, a convergence device, etc. Login procedures consisting of the student providing a user identification (ID) and a password are well known in the relevant art(s). Once the student has logged onto VLT online client 104, the process proceeds to decision block 206.

In decision block 206, it is determined whether a homework assignment is available for the student. If a homework assignment is not available for the student, then either the student has completed all of their current homework assignments or the teacher has not assigned any new homework assignments. In this case, the process proceeds to decision block 208.

In decision block 208, it is determined whether other oral practice materials are available for training the student that the student may use as a practice module. If other oral practice materials are available for training the student, the process proceeds to block 210.

In block 210, the student may select an oral practice module from the other oral practice materials and perform the module. Upon completion of the practice module, the results of the practice module are uploaded to VLT online server 112 (block 212). The process then proceeds to decision block 214 to query the student as to whether the student desires to continue practicing. If the student desires to continue practicing, the process proceeds back to decision block 208 to determine whether another practice module is available.

In decision block 208, if it is determined that there are no practice modules available, the process proceeds to block 216, where the process ends. Returning to decision block 214, if it is determined that the student does not wish to continue practicing, then the process proceeds to block 216, where the process ends.

Returning to decision block 206, if it is determined that a homework assignment, such as oral practice or any other type of assignment, is available for the student, the process proceeds to block 218. In block 218, the student may perform the homework assignment on VLT online client 104. Upon completion of the homework assignment, the results of the homework assignment, including status completion results, feedback and grading (that is, analysis results), are uploaded to VLT online server 112 (block 220). The process then proceeds back to decision block 206 to determine whether another homework assignment is available.

A CALL system such as the one shown in FIGS. 1 and 2 is limited if it focuses on pronunciation and vocabulary and even if it focuses on the accuracy of the spoken utterance. The evaluation provided to the student is limited to the accuracy of pronunciation and perhaps intonation of particular sentences, words or phonemes in a passage. This type of analysis and presentation do not accurately measure performance that would be obtained in real language speaking situations. Real speaking situations are often different in that the speaker may need to form ideas, determine how to best express those ideas and consider what others are saying all under time pressure or other stress.

Fluency may be more accurately evaluated by measuring not only accuracy but also speed. A speaker that is comfortable speaking at normal speeds for the language may be better able to communicate in real speaking situations. Adding a speed measurement to the quality measurement makes the fluency assessment more holistic and better reflects a speaker's ability to use learned language skills in a real speaking environment. It may be possible for a student to meet all the pronunciation, intonation and other benchmarks of a CALL system or other language tool simply by slowing down. However, if the student cannot accurately pronounce a passage at normal speaking speed, the student may still not be comprehensible to others. In addition, slow speech may reflect a slower ability to form sounds or even form thoughts and sentences in the language.

The fluency ($F_{user}$) of an utterance of a user or student may be compared to a benchmark utterance as shown in the following example equation 1.

$$F_{user} = (A_{user}/A_{ben})(D_{ben}/D_{user})100\% \qquad \text{Eq. 1}$$

In this equation $F_{user}$ represents a score for the fluency of an utterance of a user. $A_{user}$ and $A_{ben}$ represents the accuracy of the user's utterance and the accuracy of a benchmark utterance. The benchmark is the standard against which the user or student is to be measured. The accuracy values may be numbers determined based on pronunciation or intonation or both and may be determined in any of a variety of different ways. The ratio ($A_{user}/A_{ben}$) provides an indication of how closely the user's utterance matches that of the benchmark.

$D_{ben}$ and $D_{user}$ represent the duration of the benchmark and the duration of the utterance, respectively. In one example, the utterance is a sentence or passage and native speakers are asked to read it at a relaxed pace. The time that it takes one or more native speakers to read the passage in seconds is taken as the benchmark duration for the utterance. When the user speaks the passage the time that the user takes to speak the passage is also measured and this is used as the duration for the user. The ratio provides a measure of how close the user has come to the benchmark speed. By multiplying accuracy and duration together as shown in Equation 1, the fluency score can reflect achievement in both areas. While the two scores are being shown as multiplied together, they may be combined in other ways.

The fluency score is shown as being factored by 100%. This allows the student to see the fluency score as a percentage. Accordingly, a perfect score would show as 100%. However, other scales may be used. A score may be presented as value between 1 and 10 or any other number. The Fluency score may alternatively be presented as a raw unscaled score.

The fluency score may be calculated in a variety of different ways. As an alternative to Equation 1, the benchmark values may be consolidated. If the benchmarks for any particular utterance are a constant, then $A_{ben}$ and $D_{ben}$ may be reduced to a factor and this factor may be scaled on the percent or any other scale to produce a constant n. The fluency score may then be determined as shown in Equation 2. As suggested by Equation 2, the user's fluency may be scored as the accuracy of the utterance divided by the amount of time used to speak the utterance. In other words it is the accuracy score per unit time.

$$F_{user} = (A_{user}/D_{user})n\% \qquad \text{Eq. 2}$$

Either or both ratios may be weighted to reflect a greater or lesser importance as shown in Equation 3. In Equation 3, a is a weight or weighting factor that is applied to adjust the significance of the user's accuracy in the final score and b is a weighting factor to adjust the significance of the user's speed in the final fluency score. Weights may be applied to the two ratios in Equation 1 in a similar way. The weighting factors may be changed depending on the utterance, the assignment, or the level of proficiency in the language. For example, for a beginning student, it may be more important to stress accuracy in producing the sounds of the language. For an advanced student, it may be more important to stress normal speaking tempos.

$$F_{user} = (aA_{user}/bD_{user})n\% \qquad \text{Eq. 3}$$

Figure 3:
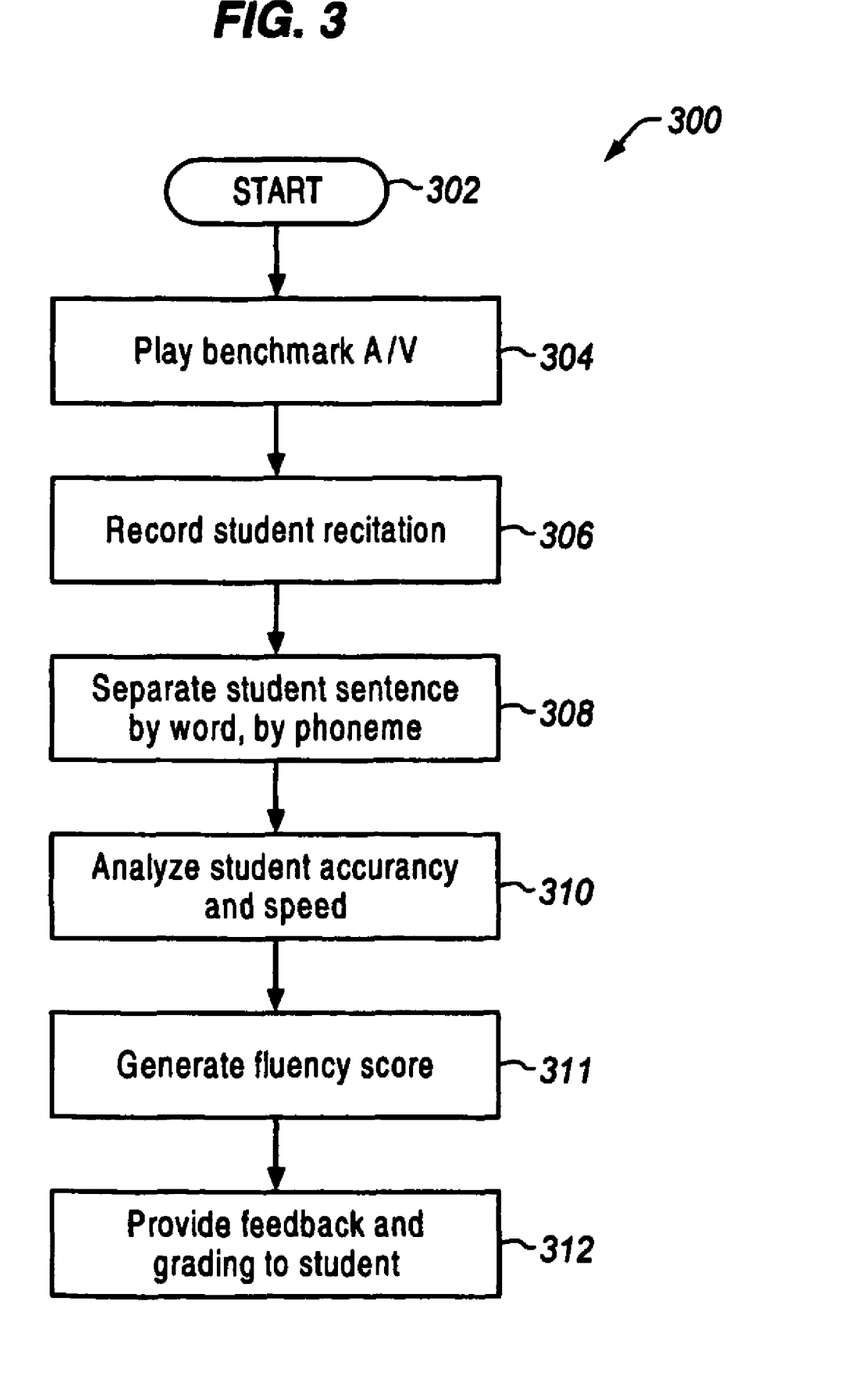
FIG. 3 is a flow diagram describing an example of a method for performing an oral practice module assignment according to an embodiment of the present invention.

FIG. 3 is a flow diagram showing an example of a method for performing a homework assignment on a VLT online client or any other CALL system according to an embodiment of the present invention. The invention is not limited to the embodiments described herein with respect to flow diagram 300, other functional flow diagrams are within the scope of the invention. The process begins with block 302, where the process immediately proceeds to block 304.

To perform an oral homework assignment, such as oral practice, the student may be requested to first listen to the audio portion of a benchmark voice pronunciation and intonation of a sentence by playing a benchmark A/V (block 304). In one embodiment, VLT online client 104 plays one sentence of the benchmark A/V at a time when the student presses a play button. The student also may have an option of repeating a sentence or moving to the next sentence by pressing a forward or reverse button, respectively. The benchmark A/V may include a spoken expression or a visual component only. For example, the benchmark A/V may have only an audio recitation of a benchmark expression. Alternatively, the audio may be accompanied by a visualization of a person speaking the expression or other visual cues related to the passage.

Alternatively, instead of listening to a sentence or passage, the student may be requested to read a passage. The sentence, expression, or passage may be displayed on a screen or VLT online client may refer the student to other reference materials. Further alternatives are also possible, for example, the student may be requested to compose an answer or a response to a question or other prompt. The benchmark A/V may, for example, provide an image of an object or action to prompt the student to name the object or action.

After listening to a sentence or receiving some other A/V cue, the student may respond in block 306 by pressing a record button and orally repeating the sentence back to VLT online client 104. VLT online client 104 may record the student's pronunciation of the sentence, separate the student's recorded sentence, word by word, and phoneme by phoneme (block 308), and perform any other appropriate operations on the recorded utterance.

VLT online client may then analyze the student's accuracy, by assessing for example the pronunciation and intonation of each word or phoneme by comparing it with the pronunciation and intonation of the benchmark voice or in some other way (block 310). This may be accomplished in any of a variety of different ways including using forced alignment, speech analysis, and pattern recognition techniques. VLT online client may also analyze the student's speed by measuring the elapsed time or duration of the recorded utterance and comparing it to the duration of the benchmark voice. The speed measurement may be determined on a per word, per sentence, per passage or total utterance basis. Alternatively, one or more of these speed measures may be combined. The accuracy and speed may then be combined into a fluency score (block 311), using, for example any one or more of Equations 1, 2, or 3, described above.

After comparing the student's response with the benchmark voice, VLT online client 104 provides feedback and grading to the student (block 312). The feedback and grading may provide the student with detailed information regarding both accuracy and speed, which may aid the student in knowing which sentence, word or phoneme needs improvement.

As shown in FIG. 3, the fluency of a spoken utterance may be measured when a student speaks into a computer, PDA or other device. The utterance may be captured as audio, and the accuracy and speed of the utterance may be analyzed using the captured audio. If the student speaks a known text or passage, then the captured audio may be analyzed against a benchmark for the known text. The fluency analysis may then be provided to the student.

Figure 4:
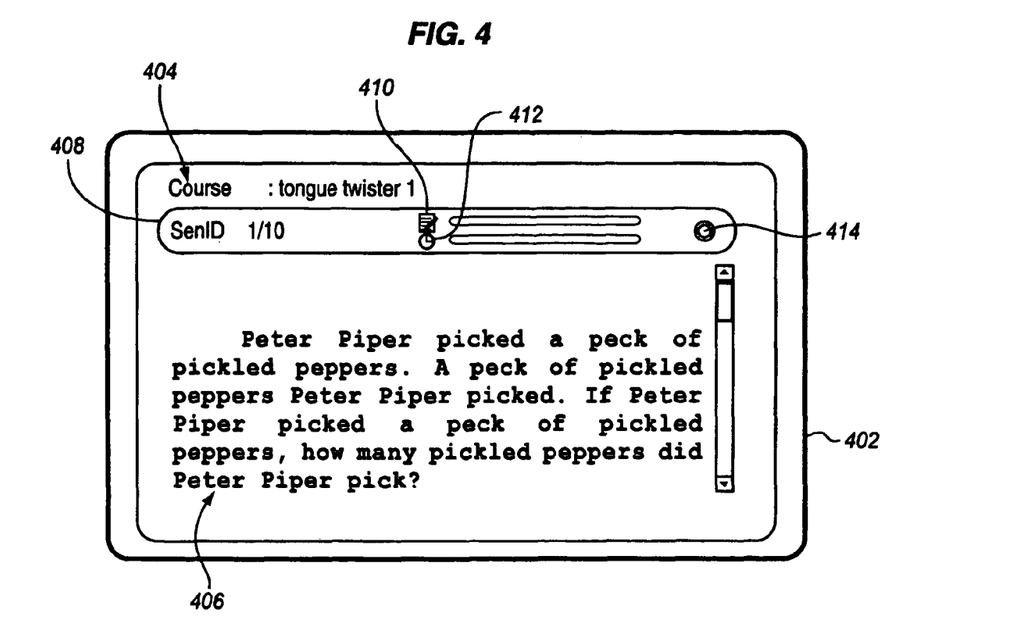
FIG. 4 is a diagram illustrating an example of a screen shot of a user interface presenting an exercise according to an embodiment of the present invention.

FIG. 4 shows an example of a display layout 402 that may be used with the process flow of FIG. 3. The display is identified with a title bar 404. In the example of FIG. 4, the title bar indicates a name for a particular course, tongue twister 1. This is the course from which the speaking exercise is taken. The title bar may be used to show a great variety of information about the display and the information in the display. The display has a transcript display area 406 in which an expression, sentence or longer passage may be displayed. This may be the text that the student is asked to read. Alternatively, as mentioned above, a question or prompt may be displayed in the Transcript display area or a picture or video sequence.

The display also has a fluency bar 408. The control panel shows in this example, an identification of the sentence as ⅒ or the first of ten sentences. An accuracy bar, identified with an accuracy icon 410 indicates the accuracy of a spoken utterance, as identified as $A_{user}$ or ($A_{user}/A_{ben}$) above, and a time bar and accompanying icon 412 indicates the time used to speak the utterance, or in other words, the speed of the spoken utterance. Additional buttons and controls may be added to the fluency rating bar. The buttons may be made context sensitive so that they are displayed only when they are operable. FIG. 4 shows a display toggle button 414 that may be selected to modify the buttons and indicators on the control panel.

Figure 5:
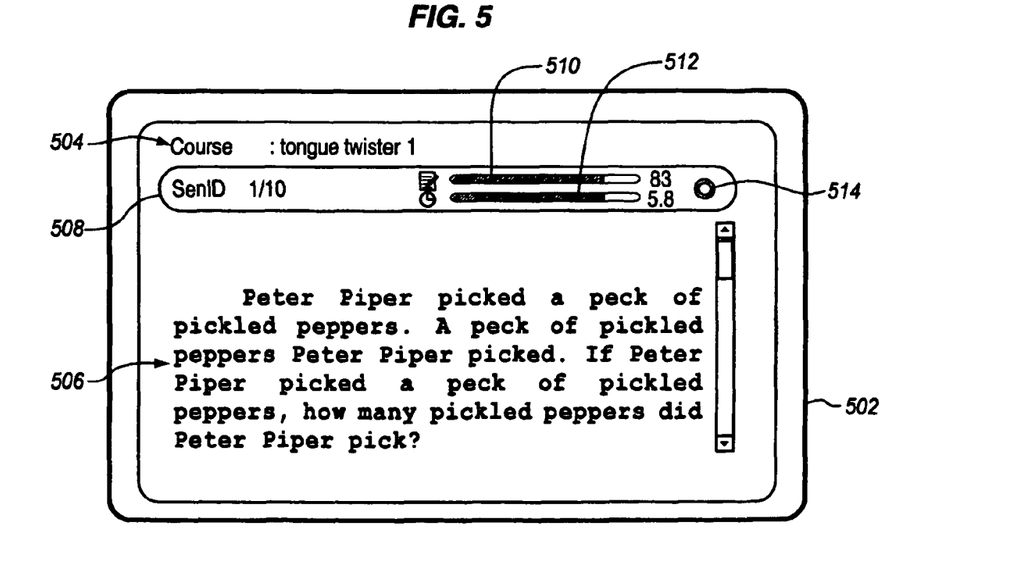
FIG. 5 is a diagram of an example of a screen shot of a user interface presenting an accuracy score and a speed score for an exercise according to an embodiment of the present invention.

In the example of FIG. 4, the CALL system is ready for the student to practice speaking the passage. In FIG. 5, the student has read the passage and the CALL system has provided a score. The display 502 of FIG. 5 includes title bar 504, transcript display area 506, and fluency rating bar 508 like that of FIG. 4. In FIG. 5, the accuracy bar 510 shows an accuracy score of 83 out of 100 and a horizontal line graphically indicates 83% of the window as filled in. The time bar indicates a time of 5.8 seconds and a horizontal line graphically indicates the portion of the allowed time or benchmark time that the student used. A quick look at the fluency rating bar in this example shows that the user has room to improve in accuracy and additional unused time to complete the passage.

Figure 6:
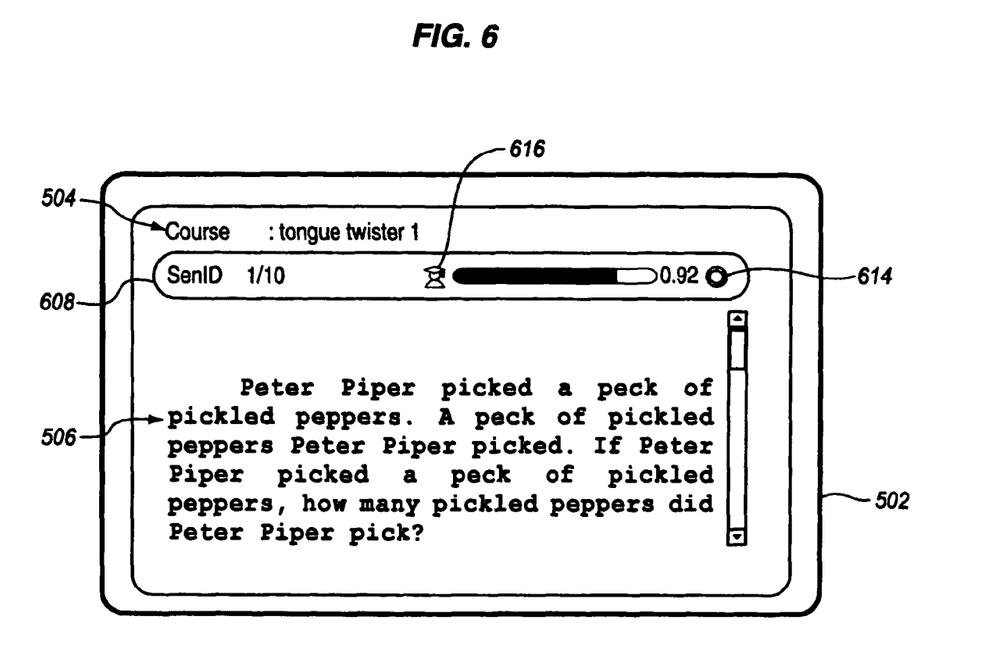
FIG. 6 is a diagram of an example of a screen shot of a user interface presenting a fluency score for an exercise according to an embodiment of the present invention.

FIG. 6 shows an example of an alternative display. In one embodiment, a student may switch between the display of FIG. 5 and the display of FIG. 6 by selecting the display toggle button 514, 614. Alternatively, both displays may be combined in a single fluency rating bar or similar information may be provided in a different way. In FIG. 6, the title bar 504 and Transcript display area 506 are the same as in the other FIGS. The fluency rating bar 608 has been changed to provide an overall combined fluency score using a score bar 616 similar to the accuracy bar 510 and the time bar 512 of FIG. 5. This score may correspond to the fluency score $F_{user}$ described above. As with the accuracy bar and the time bar, the fluency bar provides a numerical (1.10) score and a graphical horizontal line score, indicating that there is room for the student to improve.

The accuracy, speed and fluency bars are provided as an example of how to present scores to a student in both a numerical and graphical form. A great variety of different types of indicators may be used, such as vertical lines, analog dials, pie charts, etc. The bars may be scaled in any of a variety of different ways and the numerical values may be scaled as percentages, represented by letters, or provided as numbers without scaling.

The bars may also be used to provide additional information. In one example, the horizontal indicator of the time bar may be used to indicate the speed of the benchmark utterance. At the beginning of the exercise, the horizontal window may be empty or blank as shown in FIG. 4. As the student begins to speak or presses record, the window may start to fill in from left to right or vice versa. The filling in of the window may be timed so that at the end of the time required by the benchmark utterance, the window is completely filled. This give the student a rough idea of how to pace the exercise.

Other types of timing markers may also be used, for example, a marker may be superimposed over the text so that the user can try to speak the text at the same rate that the text is colored over or that a cursor advances along the text. Using the time bar, the student is encouraged to read the text before the time bar is completely filled with, for example a blue color. If the text is completed before the window is filled, as shown in FIG. 5, then the student has read faster than the benchmark. If the student reads slower than the benchmark, then the time bar may change color to red, for example, after the time bar is filled with blue and the allotted time has expired. The red bar may also advance horizontally across the window to indicate how much extra time the student has used. As shown in FIG. 5, the student may be able to improve the accuracy score of 83 by speaking more slowly and using more than 5.8 seconds of the allotted time. This may increase the fluency score shown as 1.10 in FIG. 6.

Figure 7:
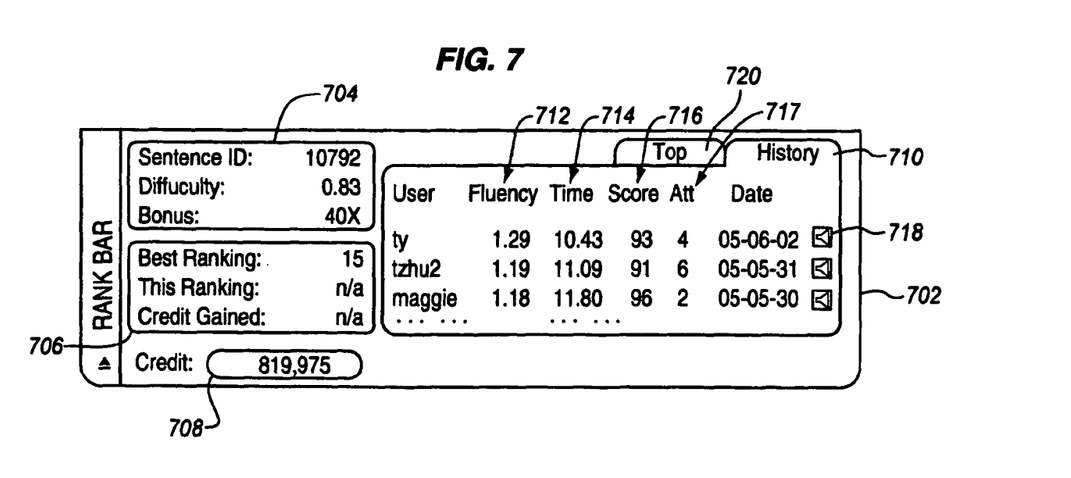
FIG. 7 is a diagram of an example of a screen shot of another user interface presenting a score for accuracy, time used and fluency for an exercise according to an embodiment of the present invention.

FIG. 7 shows another approach to displaying speed and fluency to a user. The display of FIG. 7 may be used instead of or in addition to the displays of FIGS. 4, 5, and 6. In the display 702 of FIG. 7, a title bar 704 provides information about the display such as the sentence concerned, its difficulty and any bonus points that may be applied for its completion. A rank bar 706 may display a student's ranking with respect to previous attempts or with respect to other students. In the present example, the rank bar, shows the student's ranking for the last attempt at the sentence, the best ranking for any attempt by the student at the sentence and an amount of course credit for the student's effort. A credit bar 708 may be used to track overall progress through a course of study and in this example shows the total credit earned.

A history window 710 is provided in FIG. 7 to allow a user to compare results for speaking a particular passage. As shown, the history window shows results that ty, tzhu2 and Maggie are the last three users with best performance to speak sentence 10792. The history window provides a fluency score 712, a speed score 714, in terms of the amount of time used to speak the passage, and a ranking 716 of the attempt as compared to other students. Any number of additional features may be provided in the display. For example, FIG. 7 shows speaker icons 718 to allow the student to listen to prior attempts at the passage, and a "Top" tab 720 to allow the student to view different information. For example, the "Top" tab may allow the student to see results of the top performers in a class.

The example data in the display of FIG. 7, lists three users ty, tzhu2, and Maggie and provides as the three best performers for sentence 10792. It provides their fluency score, the duration used to speak the sentence (the speed of the speech), their speed score, the number of speaking attempts used to attain the score and the date on which the score was achieved. For example, the best fluency score, 1.29, is for the user ty. This user achieved this score on the $4^{th}$ attempt to speak the sentence, speaking the sentence in only 10.43 seconds. This display allows a user to compare performances with others in a group. In another display, a user may be able to compare the user's different attempts to each other.

Figure 8:
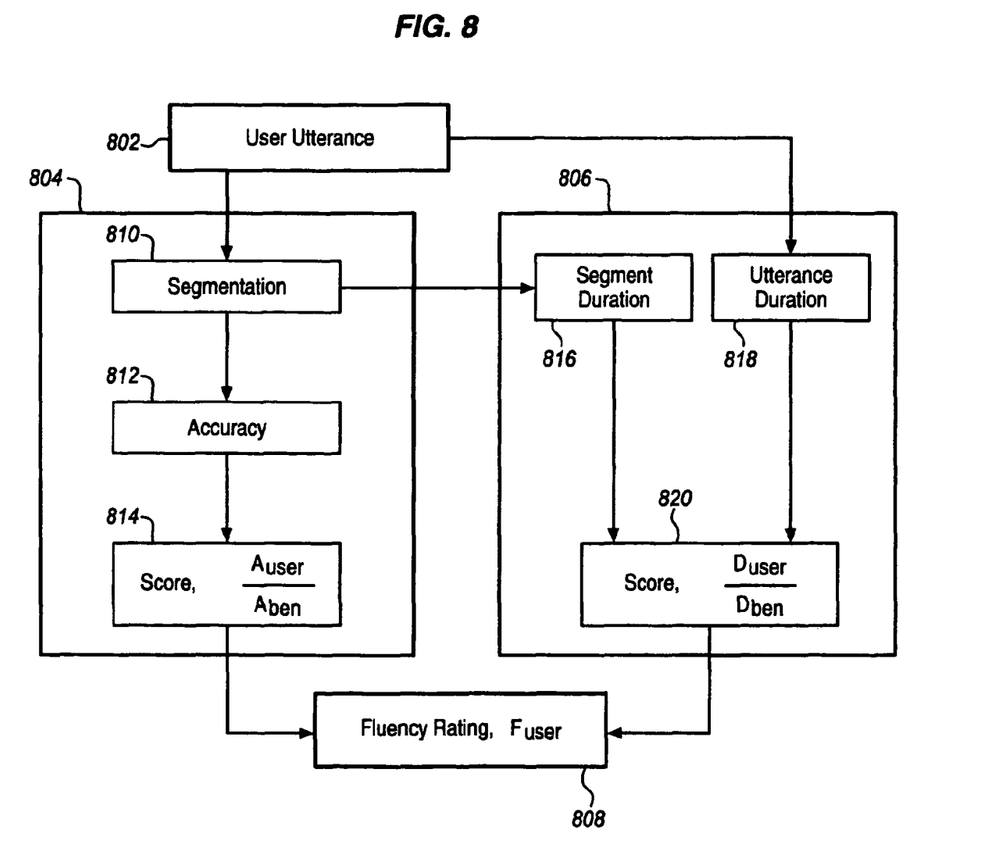
FIG. 8 is a flow diagram describing a method and apparatus for generating a fluency score according to an embodiment of the present invention.

Referring to FIG. 8, a block diagram is presented showing a process flow through various hardware or software modules to generate a fluency score. The fluency score may be presented to the user or student in any of a variety of different way including using the user interface examples of FIGS. 4-7. At block 802, a user utterance is captured. The utterance may be provided in response to a user interface such as the one shown in FIG. 4. The utterance may be recorded for processing as shown in FIG. 8. The user utterance is provided to an accuracy evaluation block 804 and a speed evaluation block 806. The two blocks each produce a score that may independently be provided to a user and the two scores may be combined to generate a fluency score at block 808. All three scores may be provided to a user as shown in FIGS. 5-7 or in any other way. Additional scores may be generated in other blocks (not shown) that evaluate other aspects of the user's utterance. The utterance and scores may be saved in memory (not shown) for reference later.

In the accuracy block 804, the utterance may be segmented at block 810 into sentences, words, syllables, phonemes, or any other portions. An accuracy analysis may then be performed at block 812 on each of the portions. Different evaluations may be performed on different types of portions. For example, words may be evaluated for pitch changes and phonemes may be evaluated for pronunciation. A great variety of different tests of pronunciation or other aspects of the utterance may be evaluated. After the evaluation, a score is generated at block 814 that provides a characterization of the accuracy of the utterance as compared to the benchmark utterance. A single score may be produced or multiple scores for different aspects of the evaluation may be produced together with a combined accuracy score. In the description above, this accuracy score is represented by $A_{user}/A_{ben}$.

The user utterance is also provided to the speed evaluation block 806. Here the total duration of the utterance is compared to the duration of a benchmark utterance at block 818. The comparison is applied to generate a score at block 820. In addition to, or instead of a total duration comparison, any one or more of the portions generated from the segmentation block 810 may be applied to a segment duration comparison at block 816. The segment duration comparison may be used to compare the duration of each sentence, word or syllable to the benchmark. Such a comparison may be used to ensure that a speaker speaks at an even tempo or that some words are not spoken more quickly than other words. The segment duration block is coupled to the score generation block 820. The score generated here is represented in the description above by $D_{user}/D_{ben}$. As mentioned above the accuracy score and the duration score are combined to generate the fluency score at block 808. The fluency score and any one or more of the other final or intermediate scores may be recorded and presented to the user as described above in the context of FIGS. 5-7.

In one embodiment and as represented by Equation 1, above, only the final accuracy score and the final speed score are used to determine a fluency score. These scores are presented to the user only in their final form. In another embodiment, the user may be presented with detailed information about the timing of each word and sentence and is scored on that basis. For example, instead of or in addition to a score for the total duration of the utterance, a score for the duration of each sentence or word may be determined. These separate scores may be combined to arrive at the total speed score. As a result a score may be higher if some words of a passage were spoken quickly enough and others too slowly, than if all the words were spoken too slowly even if the total amount of time used was the same.

Figure 9:
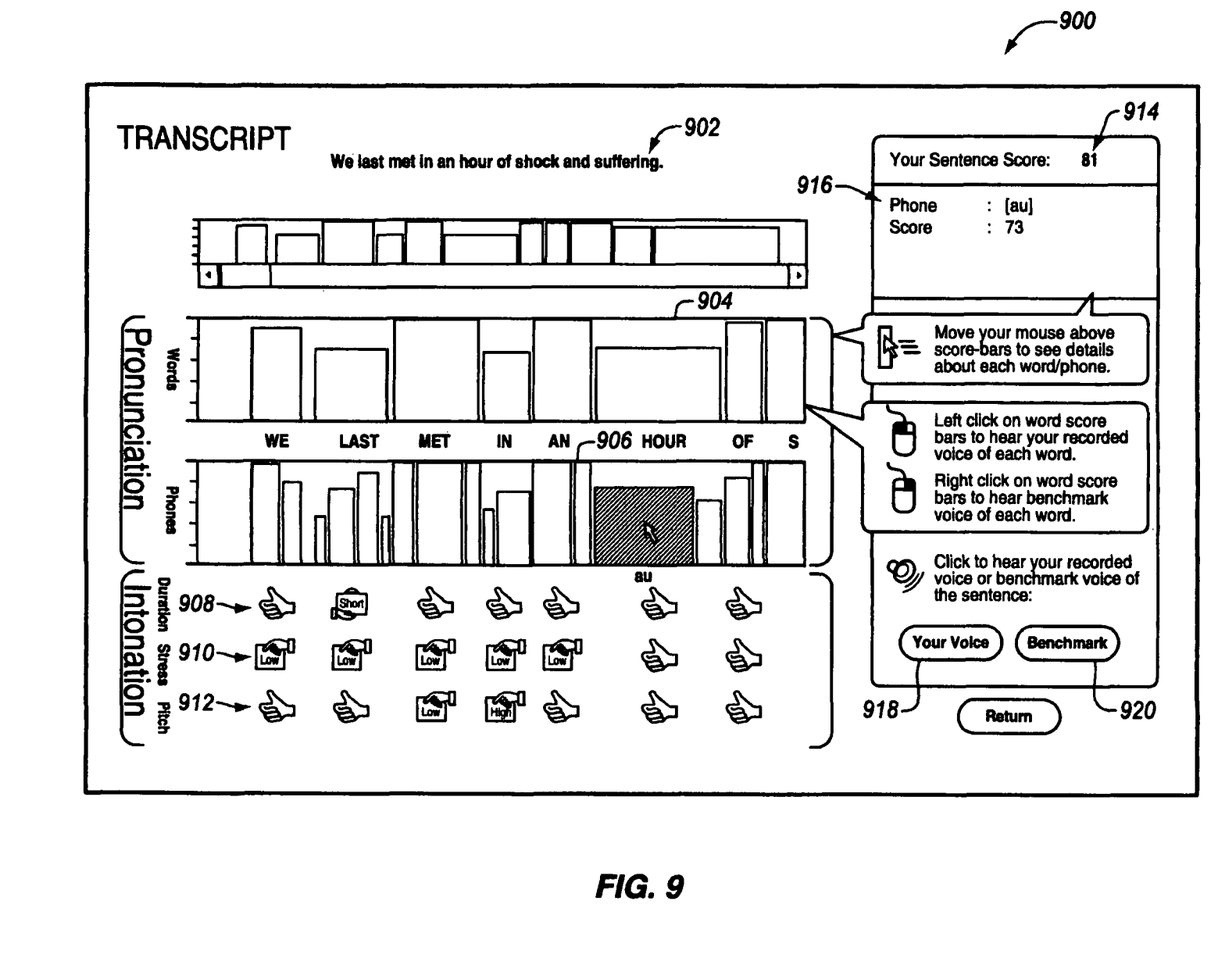
FIG. 9 is a diagram illustrating an example of a screen shot of word by word feedback and grading according to an embodiment of the present invention.

Such a word by word analysis may be presented to a student using a user interface such as that shown in FIG. 9. FIG. 9 is a diagram illustrating an example of a screen shot 900 of feedback and grading provided by VLT online client 104 after a response to a sentence. FIG. 9 shows a sentence from the transcript 902 (that is, the transcript of the benchmark audio portion), the pronunciation results for each word 904 and phoneme 906 (shown as phones in the display), and the intonation results for each word in the form of duration 908, stress 910, and pitch 912. A thumb up means a good intonation result. More information will be prompted if the intonation of the work is not as good as the benchmark. For duration, the terms short and long are used to indicate that the duration was too short or too long. For stress and pitch, the terms low and high are used to indicate a low/high stress or a low/high pitch, respectively. Screen shot 900 also includes an overall sentence score 914 and an overall phoneme score 916. As indicated in FIG. 9, a student may position his/her mouse above a score bar to see details about each word or phoneme. A student may also hear their recorded voice for each word by a left click of the mouse on the word score bar. A right click of the mouse on the word score bar enables the student to hear the benchmark voice of the word. To hear the student recording, the student may select the "Your Voice" button 918 and to hear the benchmark voice, the student may select the "Benchmark" button 920.

Although embodiments of the present invention have been described as a client/server based computer assisted language learning system for teaching students a language, other environments are also possible. For example, the system may comprise a VLT online module that is coupled to a hard disk drive and/or a removable storage drive, such as a floppy disk drive, a magnetic tape drive, an optical disk drive, etc. Removable storage drives read from and/or write to removable storage units, such as a floppy disk, magnetic tape, optical disk, etc., in a well-known manner. In this embodiment, both the student and teacher may interact with the VLT online module. In one such embodiment, assignments may be in the form of a CD-ROM (Compact Disc Read Only Memory), floppy disk, magnetic tape, optical disk, etc. Student histories may be stored on the hard disk drive, which may be accessible to both the student and the teacher.

Figure 10:
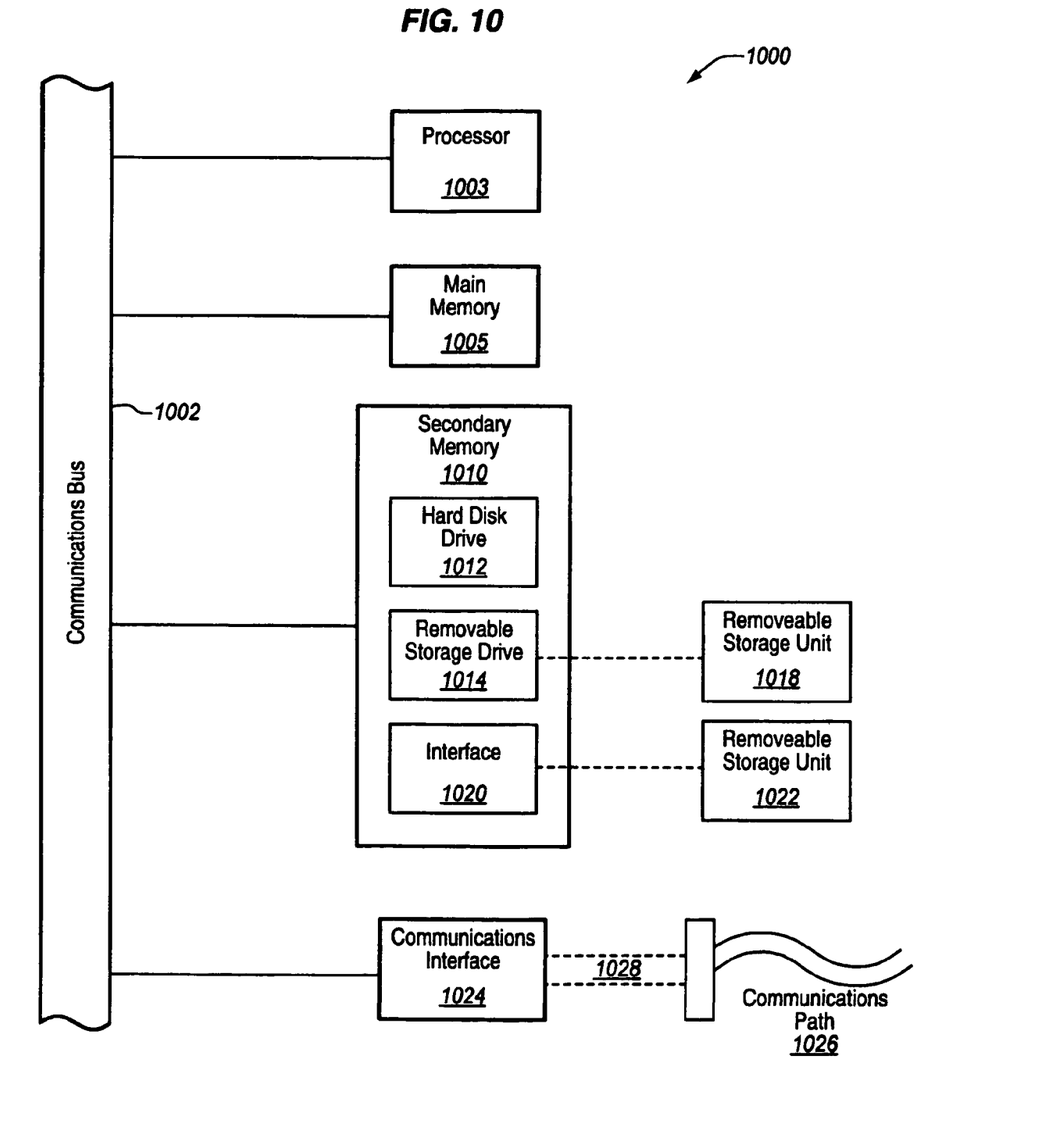
FIG. 10 is a block diagram illustrating an example of a computer system in which certain aspects of the invention may be implemented.

Embodiments of the present invention may be implemented using hardware, software, or a combination thereof and may be implemented in one or more computer systems or other processing systems. In one embodiment, the invention is directed toward one or more computer systems capable of carrying out the functionality described herein. An example implementation of a computer system 1000 is shown in FIG. 10. Various embodiments are described in terms of this example of a computer system 1000, however other computer systems or computer architectures may be used.

Computer system 1000 includes one or more processors, such as processor 1003. Processor 1003 is connected to a communication bus 1002. Computer system 1000 also includes a main memory 1005, such as random access memory (RAM) or a derivative thereof (such as SRAM, DRAM, etc.), and may also include a secondary memory 1010. Secondary memory 1010 may include, for example, a hard disk drive 1012 and/or a removable storage drive 1014, representing a floppy disk drive, a magnetic tape drive, an optical disk drive, etc. Removable storage drive 1014 reads from and/or writes to a removable storage unit 1018. Removable storage unit 1018 represents a floppy disk, magnetic tape, optical disk, etc., which is read by and written to by removable storage drive 1014. As will be appreciated, removable storage unit 1018 may include a machine-readable storage medium having stored therein computer software and/or data.

In alternative embodiments, secondary memory 1010 may include other ways to allow computer programs or other instructions to be loaded into computer system 1000, for example, a removable storage unit 1022 and an interface 1020. Examples may include a program cartridge and cartridge interface (such as that found in video game devices), a removable memory chip or card (such as an EPROM (erasable programmable read-only memory), PROM (programmable read-only memory), or flash memory) and associated socket, and other removable storage units 1022 and interfaces 1020 which allow software and data to be transferred from removable storage unit 1022 to computer system 1000.

Computer system 1000 may also include a communications interface 1024. Communications interface 1024 allows software and data to be transferred between computer system 1000 and external devices. Examples of communications interface 1024 may include a modem, a network interface (such as an Ethernet card), a communications port, a PCM-CIA (personal computer memory card international association) slot and card, a wireless LAN (local area network) interface, etc. Software and data transferred via communications interface 1024 are in the form of signals 1028 which may be electronic, electromagnetic, optical or other signals capable of being received by communications interface 1024. These signals 1028 are provided to communications interface 1024 via a communications path (i.e., channel) 1026. Channel 1026 carries signals 1028 and may be implemented using wire or cable, fiber optics, a phone line, a cellular phone link, a wireless link, and other communications channels.

In this document, the term "computer program product" may refer to removable storage units 1018, 1022, and signals 1028. These computer program products allow software to be provided to computer system 1000. Embodiments of the invention may be directed to such computer program products.

Computer programs (also called computer control logic) are stored in main memory 1005, and/or secondary memory 1010 and/or in computer program products. Computer programs may also be received via communications interface 1024. Such computer programs, when executed, enable computer system 1000 to perform features of embodiments of the present invention as discussed herein. In particular, the computer programs, when executed, enable processor 1003 to perform the features of embodiments of the present invention. Accordingly, such computer programs represent controllers of computer system 1000.

In an embodiment where the invention is implemented using software, the software may be stored in a computer program product and loaded into computer system 1000 using removable storage drive 1014, hard drive 1012 or communications interface 1024. The control logic (software), when executed by processor 1003, causes processor 1003 to perform functions described herein.

In another embodiment, the invention is implemented primarily in hardware using, for example, hardware components such as application specific integrated circuits (ASICs) using hardware state machine(s) to perform the functions described herein. In yet another embodiment, the invention is implemented using a combination of both hardware and software.

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

A lesser or more equipped VLT, utterance assessment and scoring process, or computer system than the examples described above may be preferred for certain implementations. Therefore, the configuration and ordering of the examples provided above may vary from implementation to implementation depending upon numerous factors, such as the hardware application, price constraints, performance requirements, technological improvements, or other circumstances. Embodiments of the present invention may also be adapted to other types of user interfaces, communication devices, learning methodologies, and languages than the examples described herein.

Embodiments of the present invention may be provided as a computer program product which may include a machine-readable medium having stored thereon instructions which may be used to program a general purpose computer, mode distribution logic, memory controller or other electronic devices to perform a process. The machine-readable medium may include, but is not limited to, floppy diskettes, optical disks, CD-ROMs, and magneto-optical disks, ROMs, RAMs, EPROMs, EEPROMs, magnet or optical cards, flash memory, or other types of media or machine-readable medium suitable for storing electronic instructions. Moreover, embodiments of the present invention may also be downloaded as a computer program product, wherein the program may be transferred from a remote computer or controller to a requesting computer or controller by way of data signals embodied in a carrier wave or other propagation medium via a communication link (e.g., a modem or network connection).

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known circuits, structures and techniques have not been shown in detail to avoid obscuring the understanding of this description.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" or "in an embodiment" appearing in various places throughout the specification are not necessarily all referring to the same embodiment.

Although embodiments of the present invention may include Chinese as the native language and English as the second language, the invention is not limited to these languages not to teaching a second language. Embodiments of the invention may be applicable to native language training as well.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described embodiments.

What is claimed is:

1. A method comprising:
    receiving a logon from a student at a client device;
    identifying the student at the device based on the logon;
    finding a language oral practice module for the identified student;
    recording a spoken utterance at the client device based on the oral practice module;
    evaluating the spoken utterance for accuracy;
    evaluating the spoken utterance for duration;
    assigning a score to the spoken utterance based on the accuracy and the duration;
    uploading the assigned score to a server device;
    comparing the assigned score to scores of other students; and displaying a ranking at the client device of the assigned score as compared to the scores of other students.

2. The method of claim 1, wherein the spoken utterance comprises a recitation of a sentence in a spoken language.

3. The method of claim 1, further comprising playing a benchmark audio to a student via a computing device, the benchmark audio comprising a sentence recited in a language to be learned by the student, and wherein evaluating the spoken utterance comprises comparing the spoken utterance from the student with the benchmark audio.

4. The method of claim 1, further comprising providing the assigned score to the speaker of the spoken utterance.

5. The method of claim 4, further comprising providing a learning history to a remote teacher using the uploaded assigned score.

6. The method of claim 1, wherein evaluating the spoken utterance for accuracy comprises evaluating the pronunciation of the spoken utterance against a benchmark.

7. The method of claim 1, wherein evaluating the spoken utterance for duration comprises measuring the duration of the spoken utterance and comparing it to the duration of a benchmark utterance.

8. The method of claim 1, wherein evaluating the spoken utterance for duration comprises dividing the spoken utterance into words and comparing the duration of each word to the duration of each word of a benchmark utterance.

9. A non-transitory machine-readable medium carrying data, that when operated on by the machine, cause the machine to perform operations comprising:
   receiving a logon from a student at a client device;
   identifying the student at the device based on the logon;
   finding a language oral practice module for the identified student;
   recording a spoken utterance at the client device based on the oral practice module;
   evaluating the spoken utterance for accuracy;
   evaluating the spoken utterance for duration;
   assigning a score to the spoken utterance based on the accuracy and the duration;
   uploading the assigned score to a server device;
   comparing the assigned score to scores of other students; and
   displaying a ranking at the client device of the assigned score as compared to the scores of other students.

10. The medium of claim 9, wherein the spoken utterance comprises a recitation of a sentence in a spoken language.

11. The medium of claim 9, further comprising playing a benchmark audio to a student via a computing device, the benchmark audio comprising a sentence recited in a language to be learned by the student, and wherein evaluating the spoken utterance comprises comparing the spoken utterance from the student with the benchmark audio.

12. The medium of claim 9, further comprising providing the assigned score to the speaker of the spoken utterance.

13. The method of claim 12, further comprising providing a learning history to a remote teacher using the uploaded assigned score.

14. The medium of claim 9, wherein evaluating the spoken utterance for accuracy comprises evaluating the pronunciation of the spoken utterance against a benchmark.

15. The medium of claim 9, wherein evaluating the spoken utterance for duration comprises measuring the duration of the spoken utterance and comparing it to the duration of a benchmark utterance.

16. The medium of claim 9, wherein evaluating the spoken utterance for duration comprises dividing the spoken utterance into words and comparing the duration of each word to the duration of each word of a benchmark utterance.

17. An apparatus comprising:
   a user interface to receive a logon from a student at a client device, to identify the student at the device based on the logon and to find a language oral practice module for the identified student;
   an accuracy evaluation block to evaluate a spoken utterance for accuracy based on the oral practice module;
   a speed evaluation block to evaluate the spoken utterance for duration;
   a fluency evaluation block coupled to the accuracy evaluation block and to the speed evaluation block to assign a score to the spoken utterance based on the accuracy and the duration;
   an online client to upload the assigned score to a server module and receive a ranking from a server; and
   a display interface to provide the ranking to the speaker of the spoken utterance.

18. The method of claim 17, further comprising a computing device to play a benchmark audio to a student, the benchmark audio comprising a sentence recited in a language to be learned by the student, and wherein evaluating the spoken utterance comprises comparing the spoken utterance from the student with the benchmark audio.

19. The apparatus of claim 17, wherein the display interface is further to provide the assigned score to the speaker of the spoken utterance.

20. The apparatus of claim 17, wherein the online client is further to upload the assigned score to a server module to provide a learning history to a remote teacher.

* * * * *